United States Patent Office 3,576,605
Patented Apr. 27, 1971

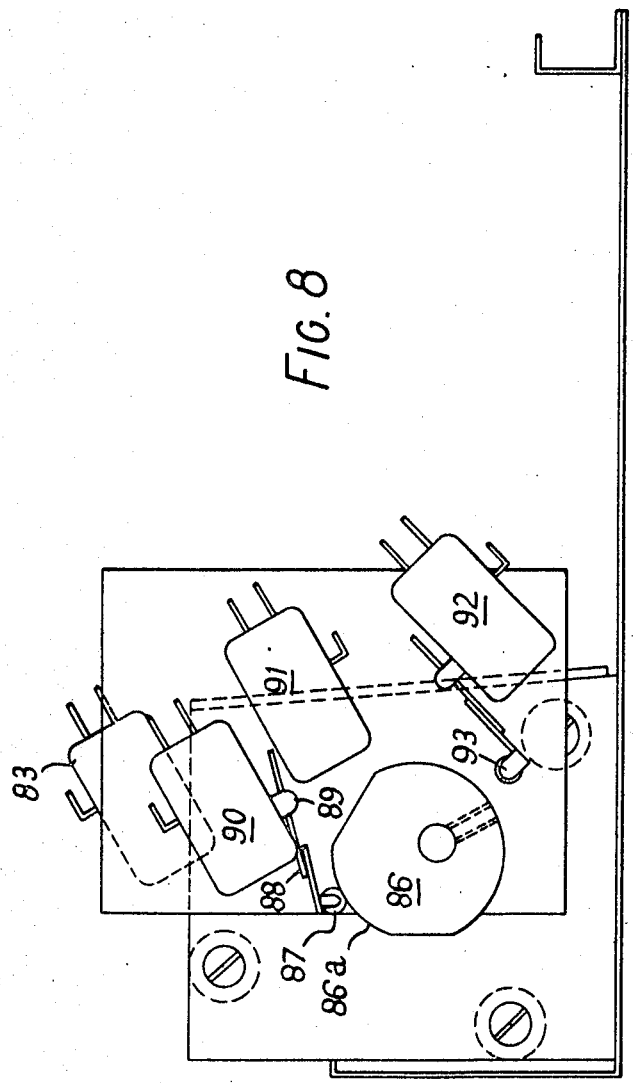

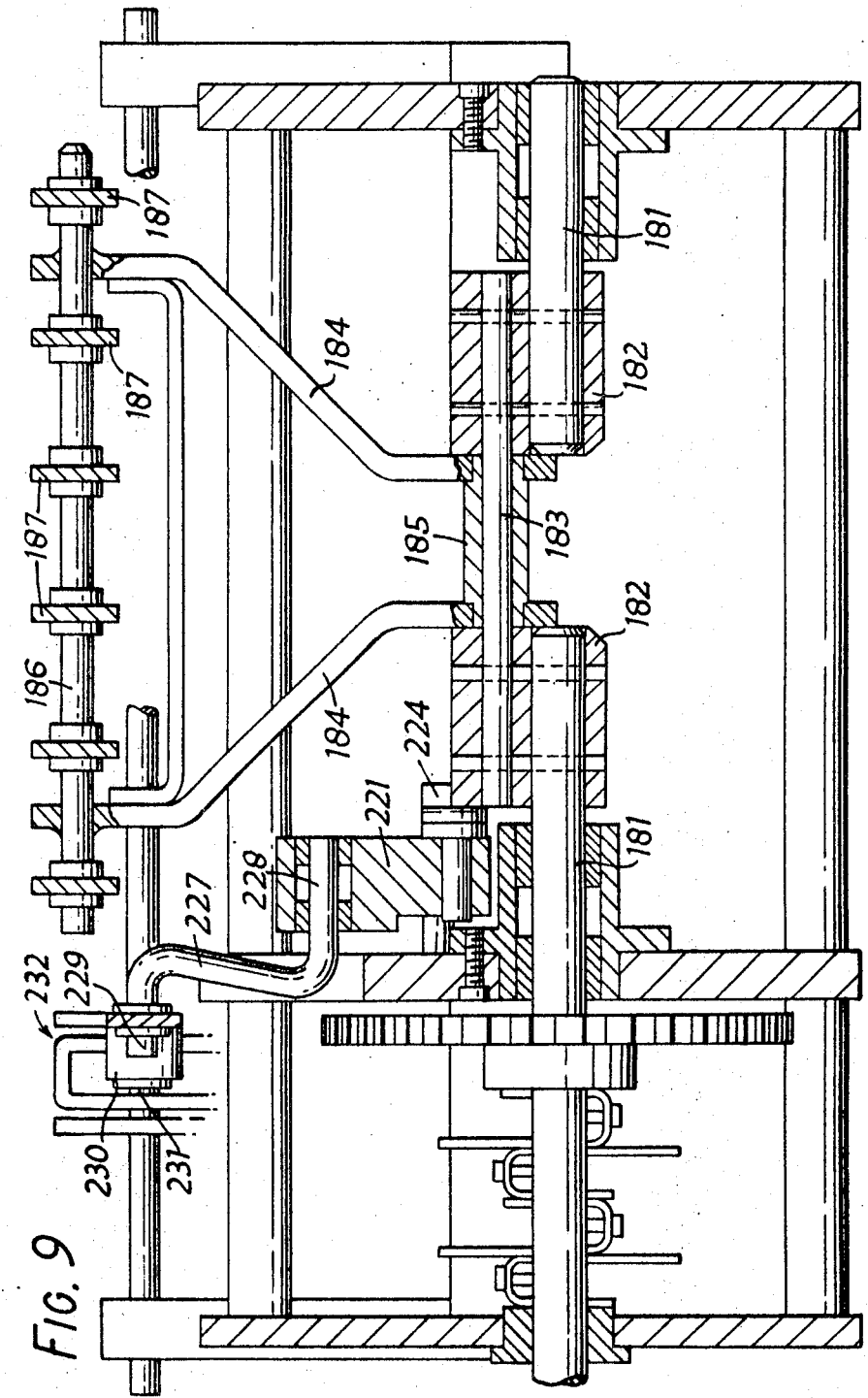

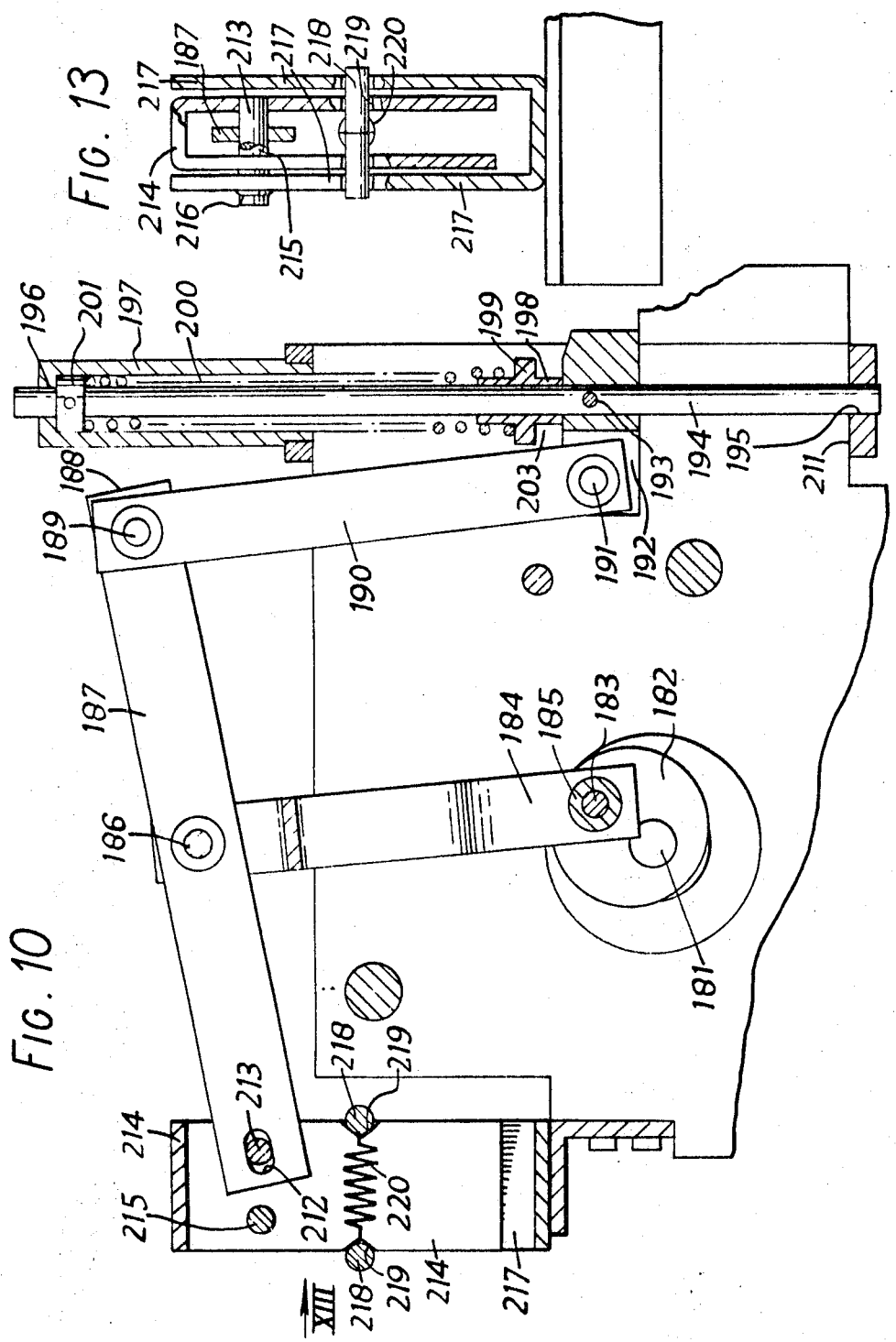

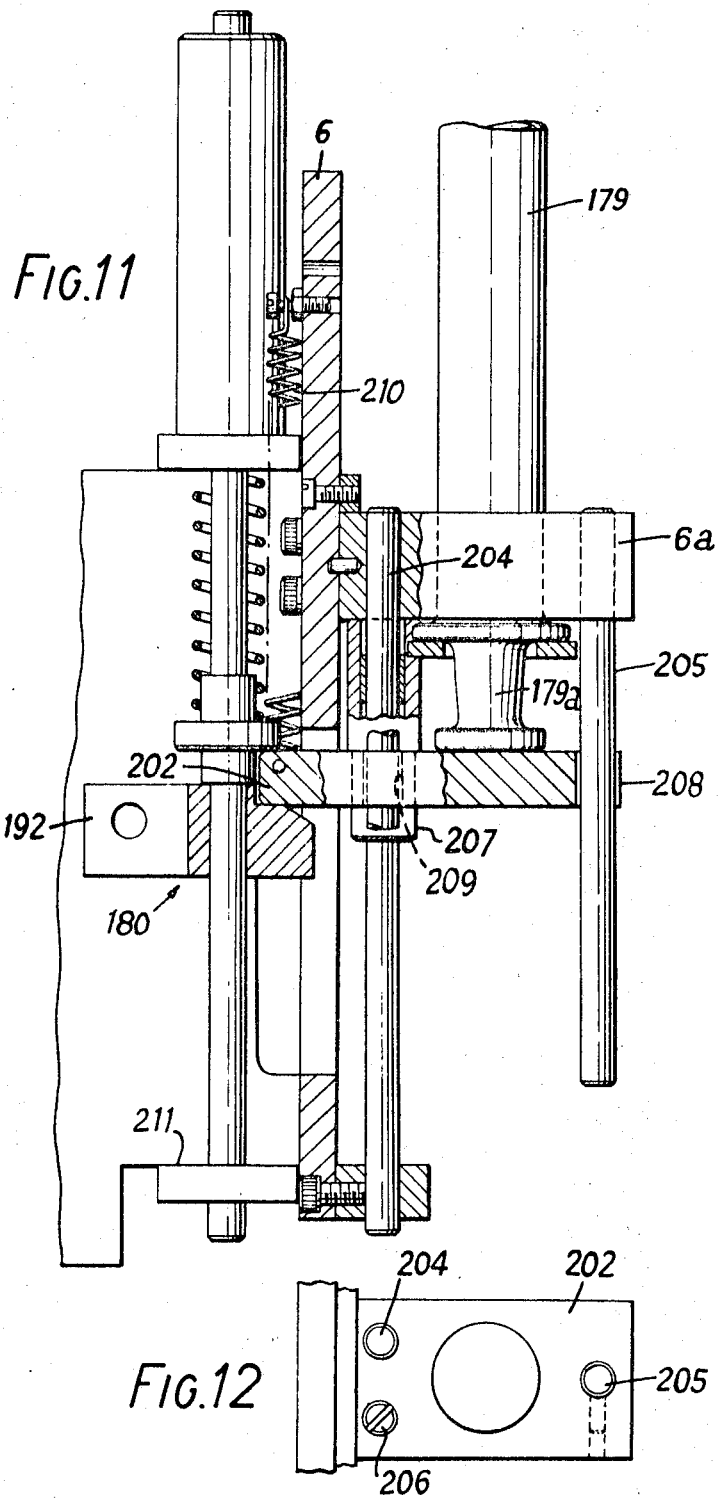

3,576,605
MULTIPLE PIPETTING APPARATUS
Alan R. Drake and Leslie E. Ruffell, Essex, and Derrick A. Patient, Kingston-on-Thames, Surrey, England, assignors to Baird and Tatlock (London) Limited, Chadwell Heath, England
Filed Feb. 11, 1969, Ser. No. 798,340
Claims priority, application Great Britain, Feb. 13, 1968, 6,918/68
Int. Cl. B01l *3/02;* G01n *1/00, 1/14*
U.S. Cl. 23—259
22 Claims

ABSTRACT OF THE DISCLOSURE

Multiple pipetting apparatus has rack means for supporting a plurality of receptacles in a rectangular array, means for moving the array in stepwise manner relative to a dipper mechanism so that the rows of receptacles are positioned in turn under the dipper mechanism and means for moving the dipper mechanism parallel to the rows so that it is positioned in turn over each receptacle of a row.

BACKGROUND OF THE INVENTION

This invention relates to a multiple pipetting apparatus and particularly to a modified and improved form of the multiple pipetting apparatus described in our co-pending patent application No. 655,442.

Briefly the pipetting apparatus described in that application has rack means for supporting a plurality of receptacles in a rectangular array, means for moving the array in stepwise manner relative to a dipper mechanism so that the rows of receptacles are positioned in turn under the dipper mechanism and means for moving the dipper mechanism parallel to the rows so that it is positioned in turn over each receptacle of a row.

The dipper mechanism may be mounted on a carriage on the main container of the apparatus; the array of receptacles being moved from outside the container into the container and the carriage of the dipper mechanism being moved across the width of the apparatus. The dipper mechanism has a head which can be raised and lowered relative to the carriage so that nozzles carried by the head are inserted into a receptacle or receptacles as the head is lowered and are raised clear of the receptacles as the head is raised. There are several nozzle supports on the dipper head and these are capable of performing different sycles simultaneously as the head is dipped and raised so that the apparatus is extremely adaptable to different functions.

The nozzles carried by the dipper head are connected through a common changeover valve means to syringes carried on a syringe plate which is attached to and detachable from the apparatus. The syringes can thus be set up and adjusted for the required cycle at a point remote from the apparatus and then attached thereto; means for driving the syringes through a dispensing and refilling cycle being part of the apparatus. The changeover valve is also carried on the syringe plate and is arranged to be driven by the syringe drive mechanism during the period when the syringe pistons are stationary. Thus a lost motion movement is provided in the syringe drive mechanism at the end of the syringe movements in each direction.

The whole pipetting apparatus is operated automatically by control means actuated by microswitches which initiate operation of one movement on completion of the preceding movement. Thus assuming that at the start a preset syringe plate is attached to the mechanism and the required row of receptacles is under the nozzles on the dipper head, the dipper is moved down inserting nozzles into a receptacle or receptacles; the dispensing or collecting operation is then performed by the syringe drive mechanism, the dipper head is then raised, the changeover valve is moved to its other position, the dipper carriage is moved until the nozzles are above the next receptacle in an associated row and the next operation is performed. When the dipper carriage reaches the end of a row, it is reversed to its original position while the array of receptacles is moved through the distance between row. The drive for moving the array of receptacles can be adjusted to move the carriage and the array respectively through either one unit distance or twice that distance on each movement depending on the cycle of operation required.

SUMMARY OF THE INVENTION

According to one aspect of the present invention there is provided a multiple pipetting apparatus comprising a carriage for supporting in a generally rectangular array a plurality of receptacles; a nozzle support; drive means to move the carriage and the nozzle support horizontally at right angles to one another and to move the nozzle support vertically towards and away from the carriage, the nozzle support comprising a first driven part capable of carrying at least one nozzle and a second part capable of carrying at least one nozzle and being movable upwardly by said first part and being selectively movable downwardly under the action of gravity according to the relative horizontal positions of the nozzle support and the carriage.

BRIEF DESCRIPTION OF THE DRAWINGS

The above and other aspects of the invention will now be described by way of example with reference to the accompanying drawings in which:

FIG. 8 is a view in the direction of the arrow VIII in FIG. 3, FIG. 9 is a sectional view through the syringe drive mechanism, FIG. 10 is a view of one side of the syringe drive mechanism, FIG. 11 is a side view showing the syringe drive mechanism coupled to a syringe carried on a syringe plate, FIG. 12 is a plan view of part of FIG. 11, FIG. 13 is a view in the direction of arrow XIII in FIG. 10.

DESCRIPTION OF THE PREFERRED EMBODIMENTS

Figure 1:
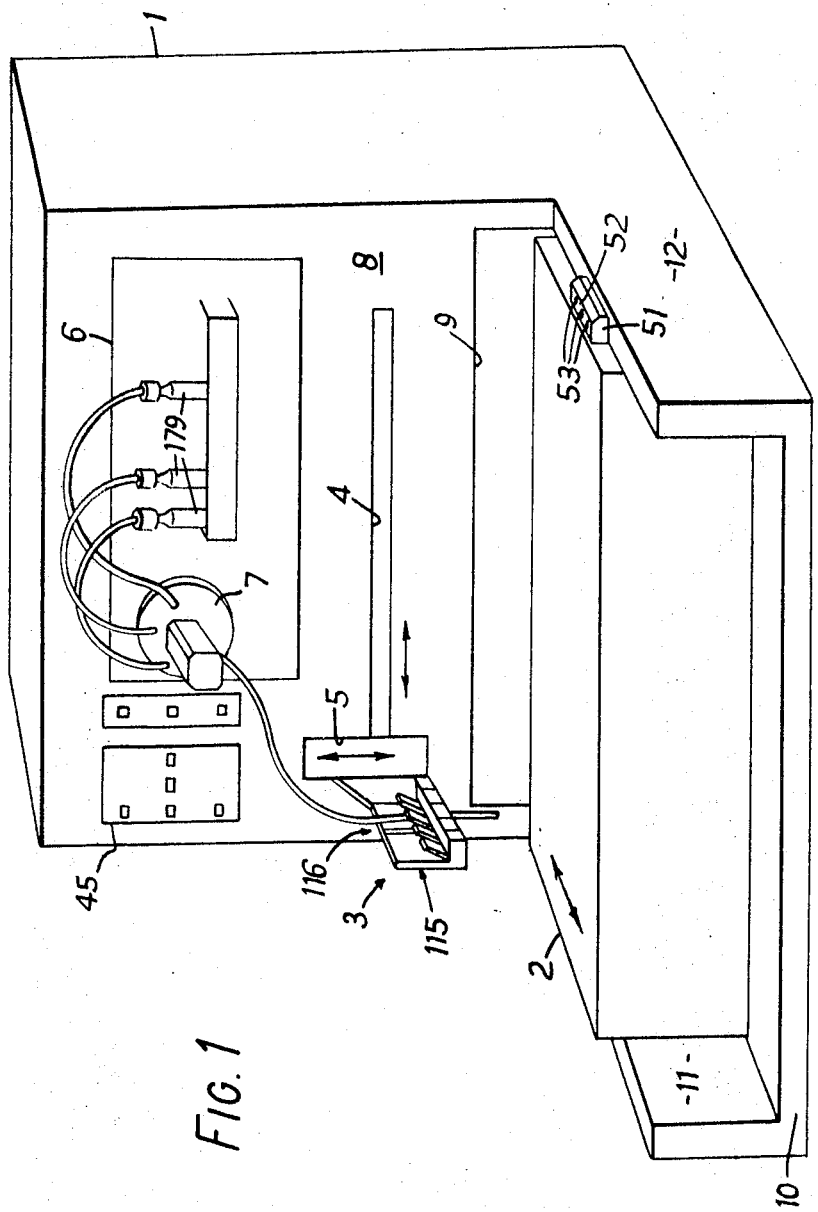
FIG. 1 is a diagrammatically perspective view of the apparatus in its casing.

Referring to FIG. 1 the multiple pipetting apparatus has a casing 1 and comprises a unit 2 constituted by a carriage and a water bath movable inwardly and outwardly of the casing; a nozzle support indicated generally at 3 movable transversely of the casing along a path indicated at 4 and also movable upwardly and downwardly along a path indicated at 5 and a removable syringe plate 6 incorporating a valve 7. The casing 1 is generally rectangular in shape having a front wall 8 formed with a rectangular aperture 9 in the lower part thereof to receive with clearance the unit 2. The apparatus also includes means for driving controlling, and correlating the operation of the parts generally indicated in FIG. 1.

Figure 2:
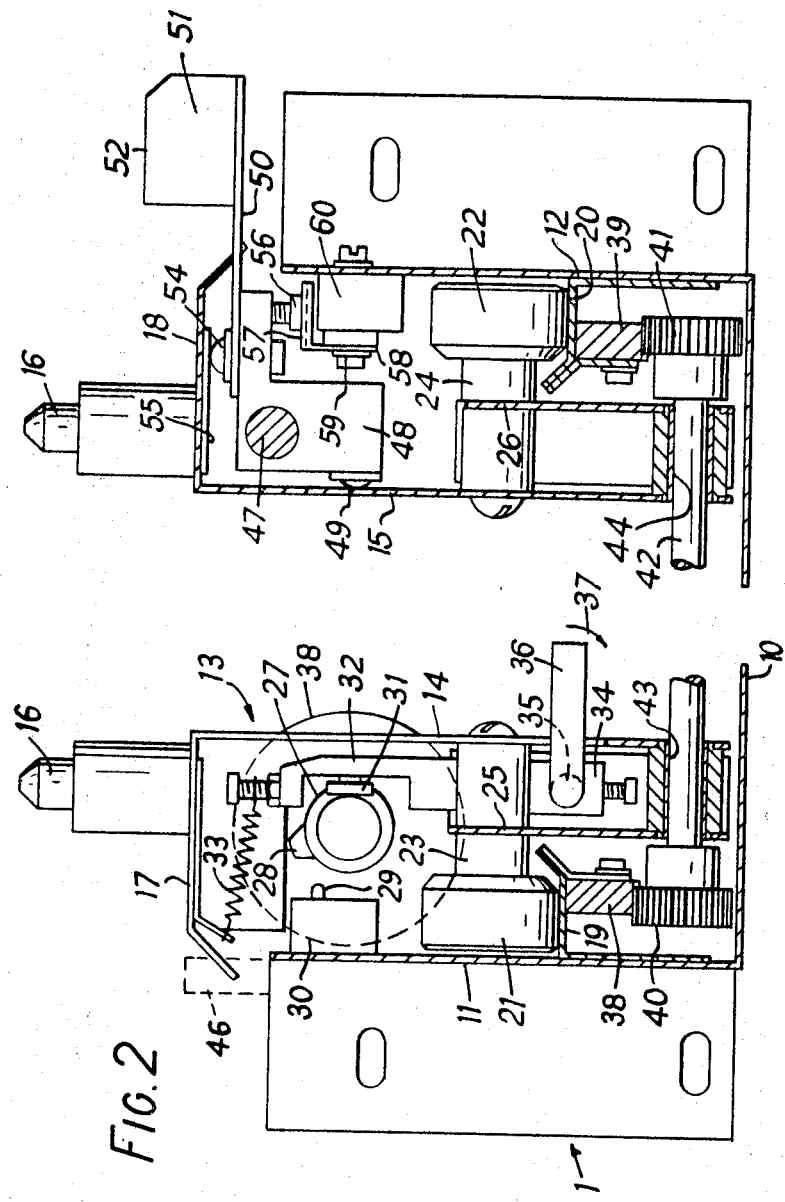
FIG. 2 is a front part sectional view of the left and right hand sides of a water bath carriage and drive means therefor.

Referring now to FIG. 2 the lower front part of the casing 1 comprises a bottom wall 10 and short upstanding side walls 11 and 12. The carriage of the unit 2, indicated generally at 13, has inverted L shaped side walls 14 and 15 and is arranged to be moved linearly into the apparatus in a direction normal to the plane of FIG. 2 and at right angles to rows of an array of receptacles supported in a water bath (not shown) carried on studs, two of which are indicated at 16 supported on the upper walls 17 and 18 of the carriage. The side walls 11 and 12 of the casing are provided with inwardly projecting parts 19 and 20 the upper surfaces of which constitute tracks for carriage support rollers, two of which are shown at 21 and 22, respectively supported to be freely rotatable on shafts 23 and 24 secured to the side walls 14 and 15 and inner support walls 25 and 26. It will be understood that a number of rollers are carried by each side wall of the carriage and that the inwardly projecting parts 19 and 20 extend substantially the whole length of the side walls 11 and 12 so that the carriage is freely movable into and put of the casing.

A lead screw 27 mounted in bearings (not shown) on the casing extends normal to the plane of FIG. 2 and parallel to the direction in which it is desired to move the carriage. The lead screw is rotatable by a carriage motor 38 mounted at the rear of the casing 1 and forwardly of the motor the lead screw carries a cam 28 for co-operation with the button 29 of a microswitch 30 as will hereinafter be described.

Drive is transmitted from the lead screw to the carriage via a roller 31 rotatable on a shaft supported towards the upper end of an arm 32 pivoted at a position (not shown) about an axis parallel with the lead screw and urged by a spring 33 in a direction to maintain engagement of the roller 31 with the lead screw. The lower end 34 of the arm 32 carries a forwardly projecting rod 35 having, externally of the front wall of the carriage, a handle 36 that may be manually depressed in the direction of the arrow 37 to pivot the arm 32 against the action of its spring so as to disengage the roller 31 from the lead screw 37 and enable the carriage and its supported water bath to be moved into and out of the casing by hand.

It is essential that movement of the carriage shall be accurate and to this end toothed racks 38 and 39 are supported beneath the inwardly projecting parts 19 and 20 to be respectively engaged by pinions 40 and 41 on opposite ends of a shaft 42 carried in bearings 43 and 44 by the casing walls 14, 25 and 15, 26. This arrangement ensures that each end of the carriage 13 is always accurately positioned although only one lead screw 27 is provided.

It is convenient to arrange the pitch of the lead screw 27 so that one revolution thereof moves the carriage a distance representative of the space between the rows of receptacles (not shown) carried in the water bath and the cam 28 operates the microswitch 30 for each revolution of the lead screw. The microswitch 30 is incorporated in a control circuit (not shown) for the motor 38 and this control circuit also includes a selector switch mounted on a panel 45 on the front wall 8 of the casing, operation of this switch causing the motor 38 to drive the lead screw 27 through two revolutions instead of one. In addition in the lower rear part of the casing 1 a carriage limit switch indicated generally at 46 is provided and coupled into the control circuit for the motor 28. The limit switch 46 is operated by the carriage to ensure that the motor does not tend to drive the carriage beyond its innermost position.

A rod 47 extends beneath the upper wall 18 parallel with the lead screw 27 and is movable with the carriage 13. An inverted L-shaped block 48 is slidable on the rod 47 and is urged in a counterclockwise direction by a spring urged ball 49 carried in its lower limb and engaging with the inner surface of the wall 15. The upper limb of the block carries an outwardly projecting arm 50 supporting a bar 51 the upper surface 52 of which is formed with three index marks 53 spaced apart the same distances as the spacing between adjacent rows of receptacles to be caried in the water bath. The upper limb of the block also carries a spring urged ball 54 engageable in a series of apertures in a plate 55 supported beneath the upper wall 18. The plate 55 has the same number of apertures as the maximum number of rows of receptacles that the water bath may accommodate and the spacing between the apertures is the same as the spacing between these rows.

Beneath the upper limb of the block 48 a pin 56 projects downwardly to be in the path of the forward inclined surface 57 of an arm 58 pivoted at 59 and normally urged upwardly by a spring (not shown) and movable downwardly under the action of the pin 56 to operate the button of a microswitch 60 carried by the casing wall 12 for a purpose to be explained hereinafter.

Referring to FIGS. 3 to 8 the nozzle support indicated generally at 3 is mounted for up and down vertical movement on a carriage 61 located internally of the casing 1 behind the front face 8 thereof. A lead screw 62 extends transversely of the casing 1 between a bearing 63 supported by the side wall 11 and a bearing 64 carried by a part 65 disposed inwardly of the side wall 12. The carriage 61 is supported on the lead screw by two sets of three rollers 66 one set being seen in FIG. 3 and the other set being seen in FIG. 5, but obscured from view in FIG. 3 by a support plate 67. Each roller 66 is freely rotatable on an associated shaft fixed to the frame of the carriage 61. Each set has its three rollers spaced apart axially of the screw and circumferentially equiangularly around the screw. Each roller is set at an angle to the screw equal to the helix angle thereof so that the rollers ride on the land 68 of the screw as the latter rotates, without scuffing. A further roller (not seen) rides in the groove 69 of the lead screw 62 and maintains the carriage 61 in positive location relative thereto so that the nozzle unit 3 moves across the width of the apparatus as the screw 62 is rotated. A support plate 70 extends across the rear of the carriage 61 and carries inwardly projecting shafts one of which is shown at 71 (FIG. 5) supporting a freely rotatable roller 72 running on a track 73 constituting part of the casing structure 1.

Figure 3:
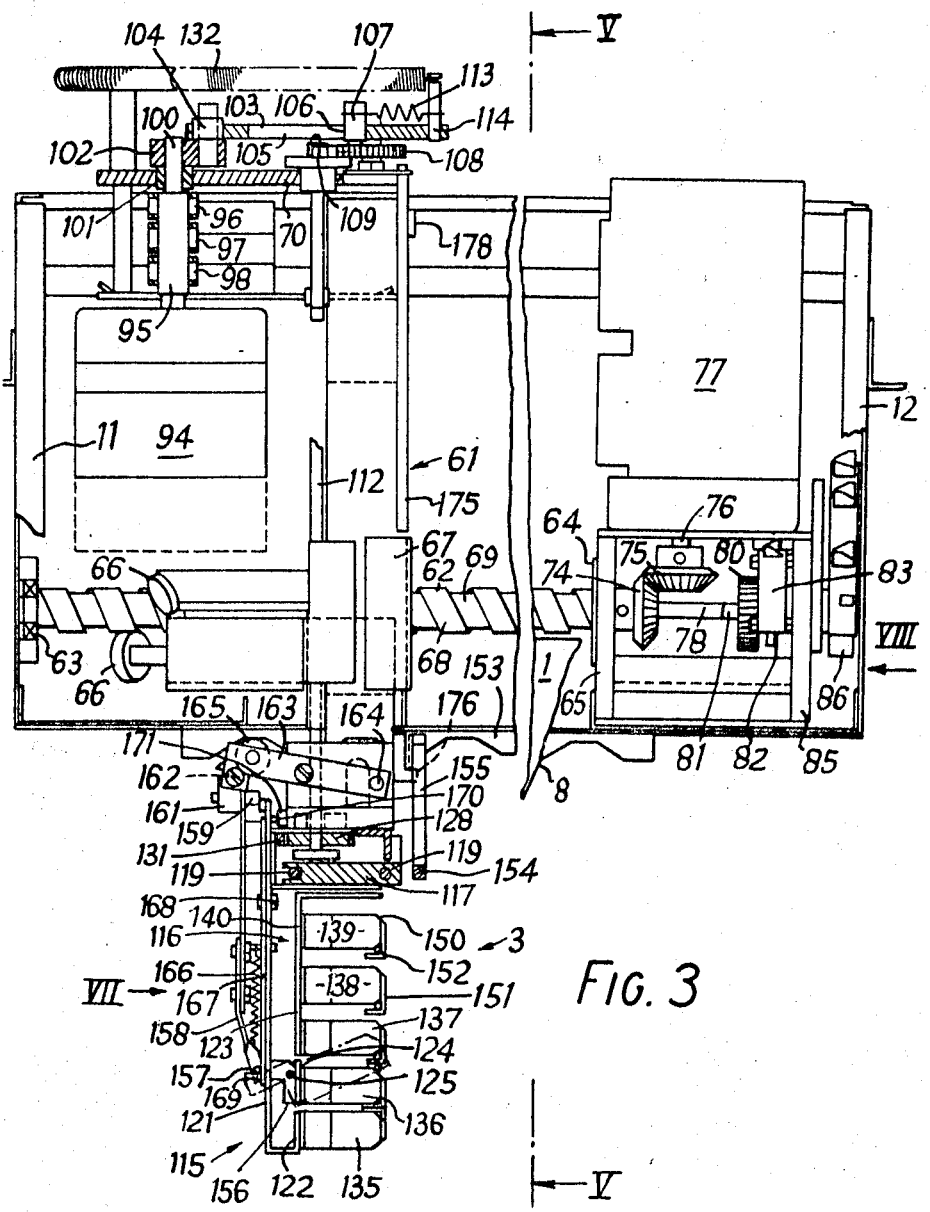
FIG. 3 is a plan view of a nozzle support and its associated drive mechanism.
Figure 4:
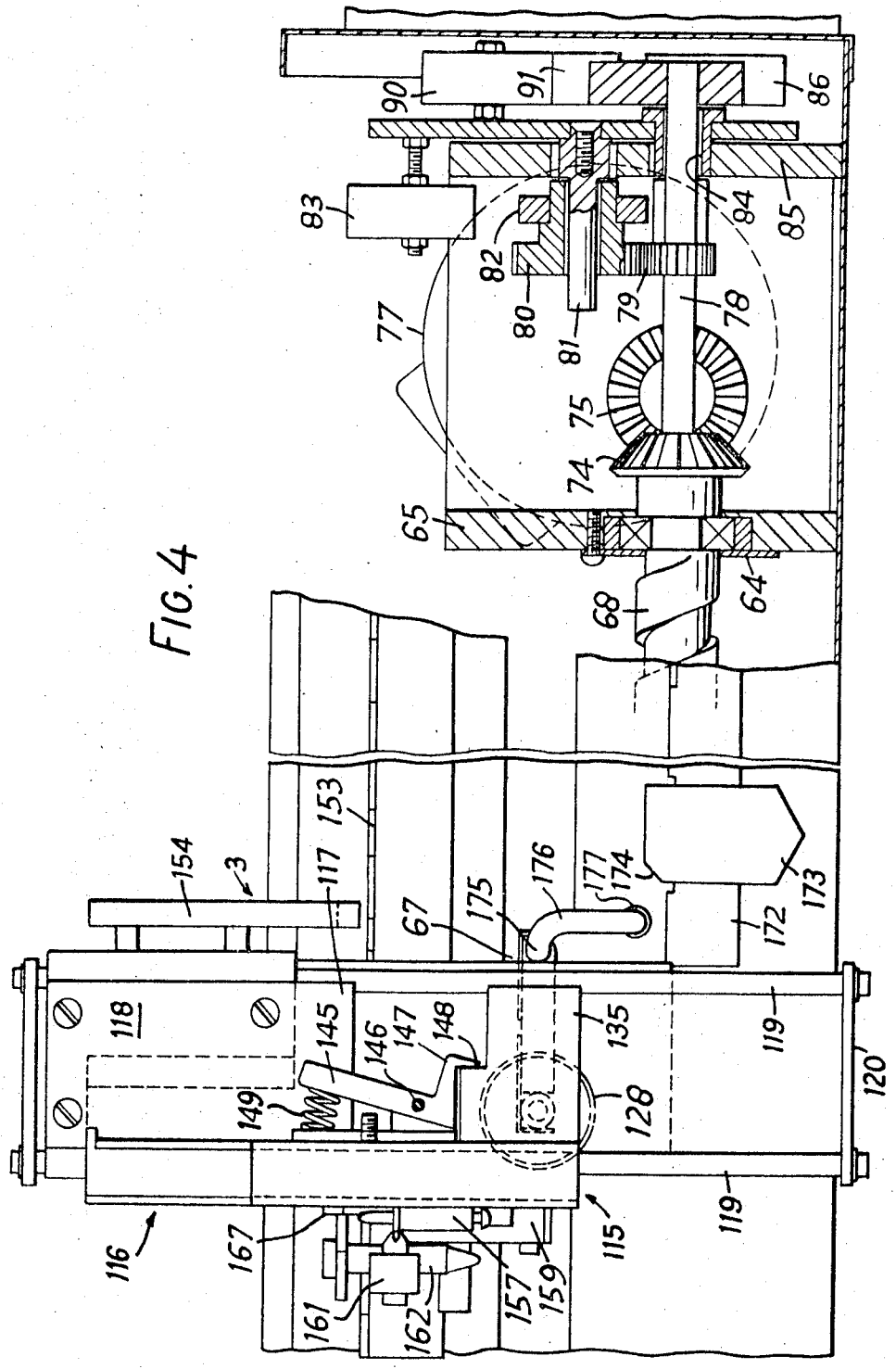
FIG. 4 is a front view with parts cut away of the nozzle support and drive mechanism of FIG. 3.
Figure 5:
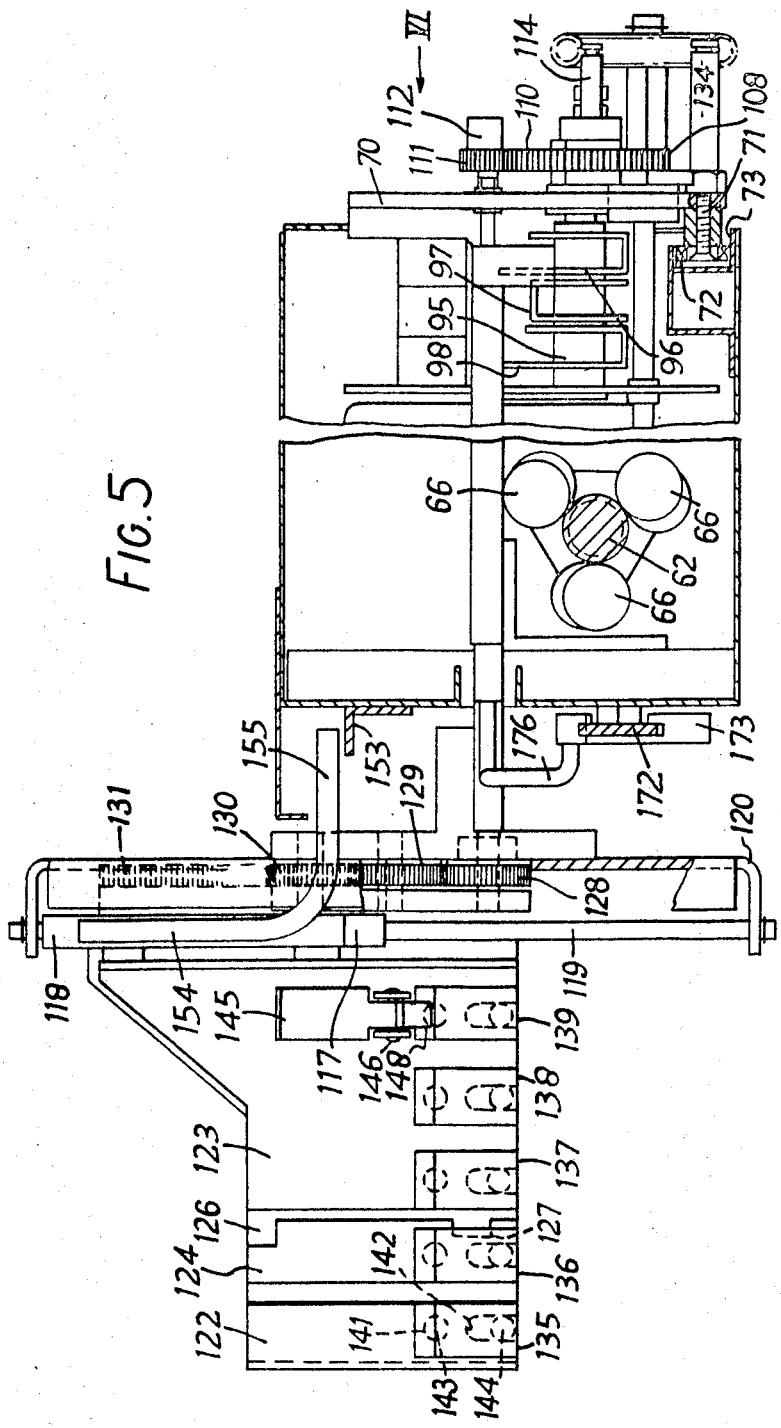
FIG. 5 is a section on the line V—V of FIG. 3.
Figure 6:
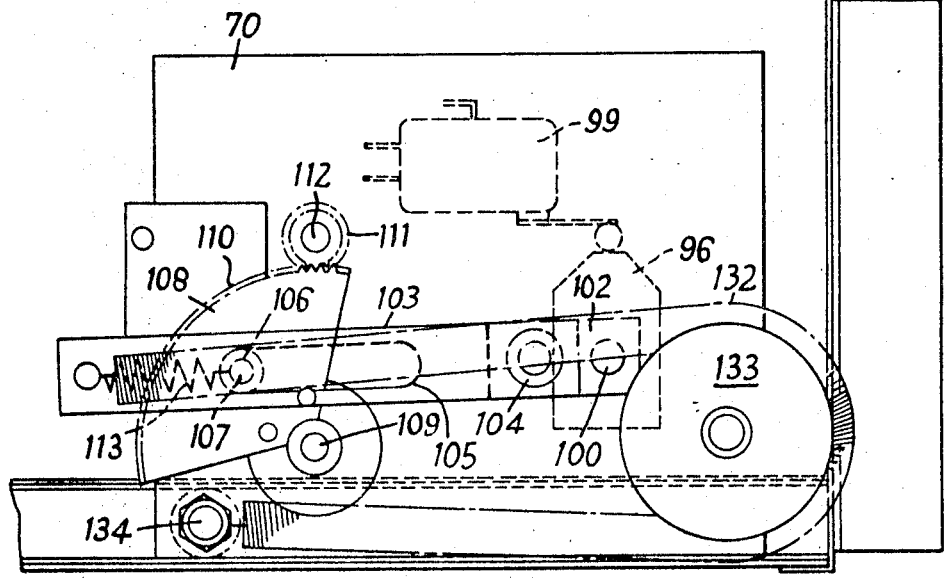
FIG. 6 is a view in the direction of the arrow VI of FIG. 5.

The right hand end of the screw 62, as seen in FIGS. 3 and 4, carries a bevel gear wheel 74 engaging with a similar wheel 75 on a drive shaft 76 of a motor 77 fixed within the casing 1. The lead screw 62 carries a shaft 78 extending beyond the gear wheel 74 and this shaft carries a pinion 79 (FIG. 4) engaging a toothed wheel 80 (FIGS. 3 and 4) of twice its circumference and rotatable on a shaft 81 extending parallel with the lead screw 62. The wheel 80 has fixed thereto a cam 82 arranged to operate a microswitch 83. As seen in FIGS. 3 and 4 the microswitch 83 is disposed above the cam 82 at an angle thereto and it is to be understood that it is provided with a spring urged roller (not shown) engaging with the surface of the cam. It will also be understood that the microswitch 83 will be operated for every two revolutions of the lead screw 62. The shaft 78 extends beyond the pinion 79 through a bearing 84 in a part 85 and carries a further cam 86 eccentrically mounted thereon and having an operative face 86a. A cam follower in the form of a roller 87 on an arm 88 pivoted at 89 is biassed towards the cam surface. The arm 88 serves simultaneously to operate a pair of microswitches 90 and 91 which deenergise the motor 77 after one revolution of the latter and at the same time apply direct current to the field coils of this motor in the sense to ensure that the latter and the lead screw stop substantially instantaneously.

A further microswitch 92 has an actuating roller 93 arranged 150° of rotation from the roller 87 and serves, after the control circuit has been primed by upward movement of the nozzle support to cancel energisation of a relay by which the motor 77 has been energised to start rotation of the lead screw 62.

The carriage 61 carries a motor 94 for moving the nozzle unit 3 vertically up and down. The motor 94 has a drive shaft 95 carrying three cams 96, 97 and 98 for operating microswitches, one of which is shown at 99 in FIG. 6. The end 100 of the shaft 95 remote from the motor extends through a bearing 101 in the support plate 70 and carries a crank 102 to which one end of a link 103 is pivoted at 104. The link 103 is formed with a slot 105 in which a roller 106 is engaged. The latter is freely rotatable on a pin 107 carried on a toothed sector 108 which is itself freely pivoted at 109 to the plate 70 and the toothed edge 110 of which engages a toothed wheel 111 (FIGS. 5 and 6) mounted on a drive shaft 112 extending parallel with the motor shaft 95 from the back of the carriage 61 to the nozzle unit 3. The pin 107 is biased by a tension spring 113 extending between it and a pin 114 carried at the end of a link 103 remote from the pin 104.

Thus for each revolution of the drive shaft 95 and the crank 102 interengagement of the link 103 with the roller 106 causes the sector 108 to be moved through part of a revolution in one direction and then through a corresponding part of a revolution in the other direction so that the wheel 111 and shaft 112 are rotated through a plurality of revolutions in one direction and then through the same number of revolutions in the opposite direction. The shaft 112 constitutes a drive shaft for moving the nozzle unit 3 upwardly and downwardly relative to the carriage 61 as will be described hereinafter.

The nozzle unit 3 comprises a first or lower driven part 115 and an upper follower part 116. These parts are respectively mounted on oppositely disposed L- shaped blocks 117 and 118 both slidable on vertical bars 119 supported by a part 120 of the carriage frame 61. The block 117 supports a plate 121 extending outwardly therefrom, the outer end of this plate being shaped to provide a short return wall 122 spaced from and extending parallel with the main part of the plate. The block 118 carries an outwardly extending support plate 123 aligned with but terminating short of the return wall 122 of the plate 121. In the space between the plate 123 and the return wall 122 and in alignment with both of these parts a plate 124 in supported by a vertically disposed pin 125 carried in bearings 126 and 127 (FIG. 5) on the plate 121 so that the plate 124 is pivotable relative to the return wall 122 and the plate 123 as will hereinafter be explained.

The forward end of the nozzle unit drive shaft 112 carries a pinion wheel 128 which drives two further pinion wheels 129 and 130 each of which is rotatable about horizontal axes, the wheels 128 and 130 engaging with a vertical rack 131 carried by a part of the plate 121 extending rearwardly of the block 117. Rotation of the drive shaft 112 in one direction thus moves the block 117 downwardly whilst rotation in the opposite direction moves the block upwardly. The provision of the additional pinion wheel 130 which rotates with the driven wheel 128 enables a shorter rack 131 to be employed than would otherwise be necessary.

It will here be understood that since the block 118 carrying the plate 123 is disposed on the rod 119 above the block 117 it will be moved upwardly therealong as the block 117 is driven upwardly and that it will follow downward movement of the block 117 under gravity unless prevented from doing so.

Reverting now to the rearward end of the carriage 61 it will be noted that a comparatively long coil spring 132 extends from the pin 114 on the link 103 around a freely rotatble pulley 133 to a pin 134 fixed to the support plate 70. This arrangement acts as a counterbalance for the nozzle unit 3 whereby the spring is extended when the unit is in its lowermost position so as to require less energy from the motor 94 to raise it to its uppermost position.

It should here be noted that in the drawings the drive mechanism for the nozzle unit is shown in the lowered position although for the sake of clarity the unit is shown in the raised position.

Five similar nozzle support blocks 135, 136, 137, 138 and 139 are arranged in alignment on the parts 115 and 116 of the nozzle unit 3. The block 135 is carried on the return wall 122 of the part 115 and the block 136 is carried on the plate 124 of the same part whereas the other three blocks 137, 138 and 139 are on the plate 123 of the part 116. The blocks are each formed on their rear face 140 with an upper blind bore 141 and a lower slot 142 (FIG. 5), each respectively engaging with pairs of pins 143 and 144 carried by the return wall 122, the plate 124 and the plate 123. The blocks are maintained in position by manually operable L-shaped latches such as 145 pivoted at 146 and having a lip 147 engaging over a shoulder 148 on their associated blocks; the latches being urged towards their engaged position with springs such as 149. Each block has its outer vertical corners chamfered, as at 150, and is provided with removable covers, such as 151, to enable nozzle tips, such as 152, to be held firmly against the blocks. As seen in FIG. 3 the nozzle tips carried by the blocks 135, 137, 138 and 139 are substantially equally spaced apart whereas in the full line position of the block 136 its nozzle tip extends close to that carried by the block 135.

A castellated plate 153 is arranged across the width of the apparatus on part of the front wall 8 of the casing, the pitch of the castellations corresponding to twice the minimum separation of receptacles in a row of the array of receptacles to be carried within the water bath. (As described in our co-pending application 655,442 the array may consist of one rack of test tubes or two racks nested within one another). The block 118 carries an arm 154 depending downwardly therefrom and having a rearwardly extending horizontal portion 155 terminating above the castellations of the plate 153 so that the end of this portion overlaps the outward projections of the plate but clears the plate in the spaces between these projections. As the block 117 and the part 115 of the nozzle unit 3 are driven downwardwardly the block 118 and part 116 will follow this movement under the action of gravity unless the portion 155 of the arm 154 is over a projection of the plate 153 in which case the block 118 and part 116 are retained in their upper position. Thus as the nozzle unit 3 is moved from left to right in FIG. 3 the block 118 and part 116 will move downwards with the part 115 on each alternate movement of the latter.

Figure 7:
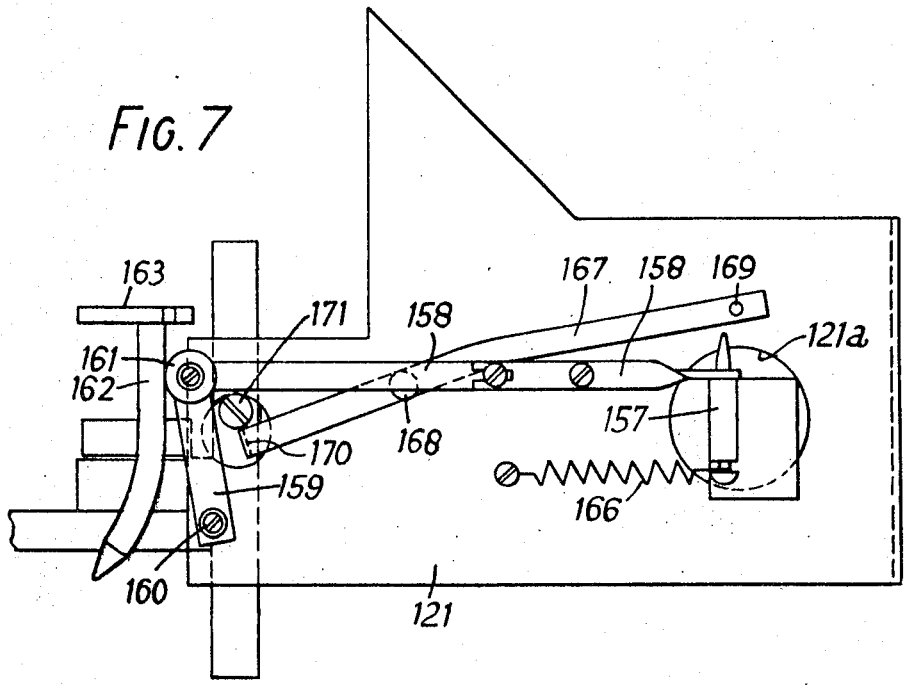
FIG. 7 is a view in the direction of the arrow VII in FIG. 3.

Reverting now to the part 115 and the nozzle block 136 mounted on the plate 124 a bracket 156 carried by the plate extends through an aperture 121a in the plate 121 and is pivoted at 157 to the outer end of a lever unit 158 extending rearwardly alongside the plate 121. The inner end of this unit is pivoted to the upper end of an arm 159 the lower end of which, as shown in FIG. 7, is pivoted at 160 to the plate 121. At the junction of the arms 158 and 159 the pivot carries a roller 161 engageable by a pin 162 carried by an L-shaped member 163 pivoted at 164 to a fixed part of the carriage 61. The member 163 also carries a roller 165 engageable with the castellations of the plate 153. A spring 166 biases the unit 158 towards the casing of the apparatus; maintains the nozzle block 136 in the full line position as shown in FIG. 3 and holds the roller 165 in engagement with the castellated plate 153.

It will be understood that as the roller 165 moves over a projection of the castellated plate 153 the unit 158 is moved, against the action of the spring 166, to pivot the nozzle block 136 to the position shown in chain lines so that its nozzle tip is disposed close to the position occupied by the nozzle tip of the block 137. It will here be understood that this pivoting movement is utilised only when the part nozzle block 137 is not in position.

A latch mechanism is provided to maintain the nozzle block 136 positively in its desired position. This mechanism comprises an arm 167 pivoted intermediate its length at 168 to the outer face of the plate 121 and carrying a pin 169 at its forward end engageable on one or other side of an upward extension to the pivot 157. The rear end of the arm 167 is formed with a tail 170 engageable beneath a screw 171 on a fixed part of the carriage frame 61. It will be understood that downward movement of the part 115 allows the arm 167 to drop when its pin 169 latches on one or other side of the pivot extension 157 to retain it in position. Although not shown in the drawing the lever unit 158 could be formed in two parts compressible longitudinally against the action of a spring so that should the nozzle block 136 be inadvertently manually moved to an incorrect position when the part 115 is in its lowermost position upward movement thereof will correct the situation. To this end the pin 162 has its lower end curved inwardly towards the front 8 of the casing 1 so as to ensure engagement of the roller 161 therewith as the part 115 moves upwards.

As will be understood by reference to our above mentioned earlier application the nozzle tips carried by the blocks 135 and 136 will dip into the same receptacle when the block 136 is in its full line unpivoted position. However, when the block 136 is pivoted to its chain line position the nozzle tip carried thereby will dip into a corresponding receptacle in an adjacent row, that is to say the receptacle beneath the nozzle tip carried by the block 137, although as mentioned above the latter would in this case not be used.

It will also be understood that in any one cycle of operation nozzles will not be attached to each nozzle block but by appropriate selection a variety of different operations may be carried out as explained in our above-mentioned co-pending application.

The front wall 8 of the casing 1 is formed with a further castellated bar 172 the spacings of which correspond with those of the plate 153. A manually adjustable tripper block 173 formed with a tapered upper surface 174 can be supported in any space of the castellations. An arm 175 extends through the carriage 61 and at its forward end has a downwardly extending part 176 carrying a roller 177 for engagement with the upper surface 174 of the block 173. At its rear end the arm 175 carries a plate 178 which when tilted actuates a microswitch (not shown) on the carriage 61.

The block 173 is set in conjunction with the bar 51 (FIGS. 1 and 2) to cause cycling of the apparatus to stop at a predetermined receptacle carried by the water bath. To this end the bar 51 has its index marks 53 corresponding with the positions of the nozzle tips carried by the block 135, 137 and 138 and is set along its bar 47 to be opposite the last used row of receptacles in the bath. The block 173 is set along its bar 172 to be opposite the last used receptacle in that row. The microswitch 60 and the microswitch operated by the plate 178 are connected in parallel in the control circuit of the apparatus to ensure that all functions of the latter stop at the desired receptacle.

The carriage 61 is moved step by step to the right in FIG. 3 by a distance determined by the selection of microswitches 90 and 91. On reaching the right hand side it trips a further microswitch (not shown) which prepares reversal of the nozzle carriage rapidly to the left hand position. If desired means (not shown) may be provided for holding the roller 105 out of engagement with the castellated plate 153 during this return movement so that the block 136 is not repeatedly pivoted. The return movement of the carriage 61 also trips movement of the carriage 13 through one or two unit movements as desired.

As described in our co-pending application No. 655,442 the apparatus has an interchangeable syringe plate 6 (FIG. 1) secured to it. The plate carries a number of individual syringes 179 which are driven through dispensing and refill motions by syringe drive means permanently carried by the apparatus. The syringes 179 are connected through the changeover valve 7, also carried by the plate 6, to the nozzle unit 3.

Referring to FIGS. 9 to 14 of the drawings the syringe plate 6 is shown in FIGS. 11 and 12 with one syringe 179 carried thereby, the operative part of the syringe drive mechanism for that syringe being shown at 180. In particular apparatus illustrated the syringe drive mechanism is arranged to drive six syringes, however; it will be understood that there may be more or less syringes. Referring to FIGS. 9 and 10 the main drive shaft for the syringe drive mechanism is shown at 181 and this carries two eccentrically mounted cylindrical blocks 182 coupled by a crank shaft 183. A pair of crank arms 184 are joined at their inner ends by a bush 185 rotatable on the crank shaft 183 and at their outer ends by a bar 186. A number of links 187 corresponding to the number of syringes each have an intermediate point thereof pivotally connected to the bar 186.

The forward ends 188 of the links 187 are each pivoted at 189 to the upper ends of outwardly extending arms 190 the lower ends of which are pivotally coupled at 191 to an associated drive block 192. Each drive block 192 is coupled at 193 with a guide rod 194 vertically slidable in a lower bearing 195 and an upper bearing 196 constituting the upper end of a cover cylinder 197. A sleeve 198 having a flanged upper part 199 is slidable on the rod 194 against the action of a spring 200 extending around the rod between the flange 199 and an upper support 201 carried by the rod.

When the syringe plate 6 is attached to the apparatus a drive block 202 for each syringe extends within the annular groove 203 defined between the drive block 192 and the flange 199. As mentioned above, the syringe plate 6 carries six syringes 179 each mounted in a block 6a projecting forwardly from the syringe plate 6. On the syringe plate each syringe has associated with it guide rods 204, 205 and a screw 206 extending downwardly from the block 6a.

Each block 202 carries a sleeve 207 which is a close sliding fit on an associated one of the rods 204; is formed with a slot 208 to run on the rod 205 and has a bore 209 (FIG. 11) in which the screw 206 can run freely. The piston 179a for each syringe is carried by the block 202 and each of the latter is raised upwardly by a spring 210 which is not of sufficient force to effect normal operation of the syringe but prevents the block falling under gravity when the syringe plate 6 is de-coupled from the apparatus.

Each screw 206 carries an adjustable nut (not seen) constituting a lower stop for arresting movement of the block 202 the upper limit of movement of this block being provided by engagement of the upper end of the sleeve 207 with the block 6a. Since the nut on the screw 206 for each syringe is individually adjustable, downward movement of the piston of that syringe on the downward stroke of the drive mechanism (i.e. the priming stroke) is adjustable for each syringe independently of the other syringes whilst upward movement of each syringe piston (i.e. the dispensing stroke) ceases at the same place for each syringe. The screw is detachably latched to the block 6a in a manner not shown in the drawings so that on withdrawal of the latch this screw, the block 202 and the syringe piston can be removed from the syringe plate to allow the syringe to be cleaned without altering the adjustment of the nut on the screw 206.

It will be understood that downward movement of the flange 99 will drive the block 202 and the piston of its associated syringe downwards until the block 202 engages the nut on its screw 206. The block 192 then continues downwardly until it engages a lower stop 211 leaving behind the sleeve 198. During this time the spring 200 is compressed. On the upward or dispensing stroke the blocks 192 and 202 will be driven up to the same upper position determined by engagement of the sleeves 207 with the block 6a.

In a modification of the mechanism above described but not shown in the drawings, each of the rods 194 has associated therewith latching mechanism which is manually operable from outside the casing 1 to prevent any downward movement of the sleeve 198 for any selected syringe. This arrangement enables syringes to be mounted on a particular syringe plate 6 but individually taken out of use for a particular cycle of operation of the apparatus whilst they remain connected with the valve 7.

The rear end of each link 187 is formed with a slot 212 in which is located an associated pin 213 pivotally mounted between two plates 214 pivoted about further pins 215 mounted in bearings 216 in outer fixed plates 217. Intermediate pins 218 are located in grooves 219 on the front and rear of the plates 214 the ends of these pins overlapping the plates 217. Each pair of pins 218 is connected by a spring 220 extending across the width of the plates. This spring tends to retain the plates 214 in their vertical position, parallel with the plates 217.

The pins 213 normally act as fixed pivots for the links 187 but the geometry of the syringe drive mechanism is such that the blocks 192 are arranged to engage their stops 211 before the crank 183 has reached its lowermost dead centre position and the blocks 192 reach their uppermost position before the crank 183 has reached its uppermost dead centre position.

After the blocks 192 have reached either their uppermost or lowermost positions the pivots 189 act as fixed pivots and the ends of the links 187 formed with the slots 212 must then move upon further movement of their associated cranks 183. Under these circumstances the plates 214 will then pivot against the action of the springs 220 in one direction for upward movement of the blocks 192 and in the opposite direction for downward movement of these blocks.

The period of this lost motion movement whilst the syringe pistons are stationary is utilised to operate the valve 7 through which the syringes are coupled to the nozzle unit 3. As described in our co-pending application No. 655,442 the valve 7 is common to all the syringes and is a change-over valve with a plurality of change-over parts and is carried on the syringe plate 6.

Figure 14:
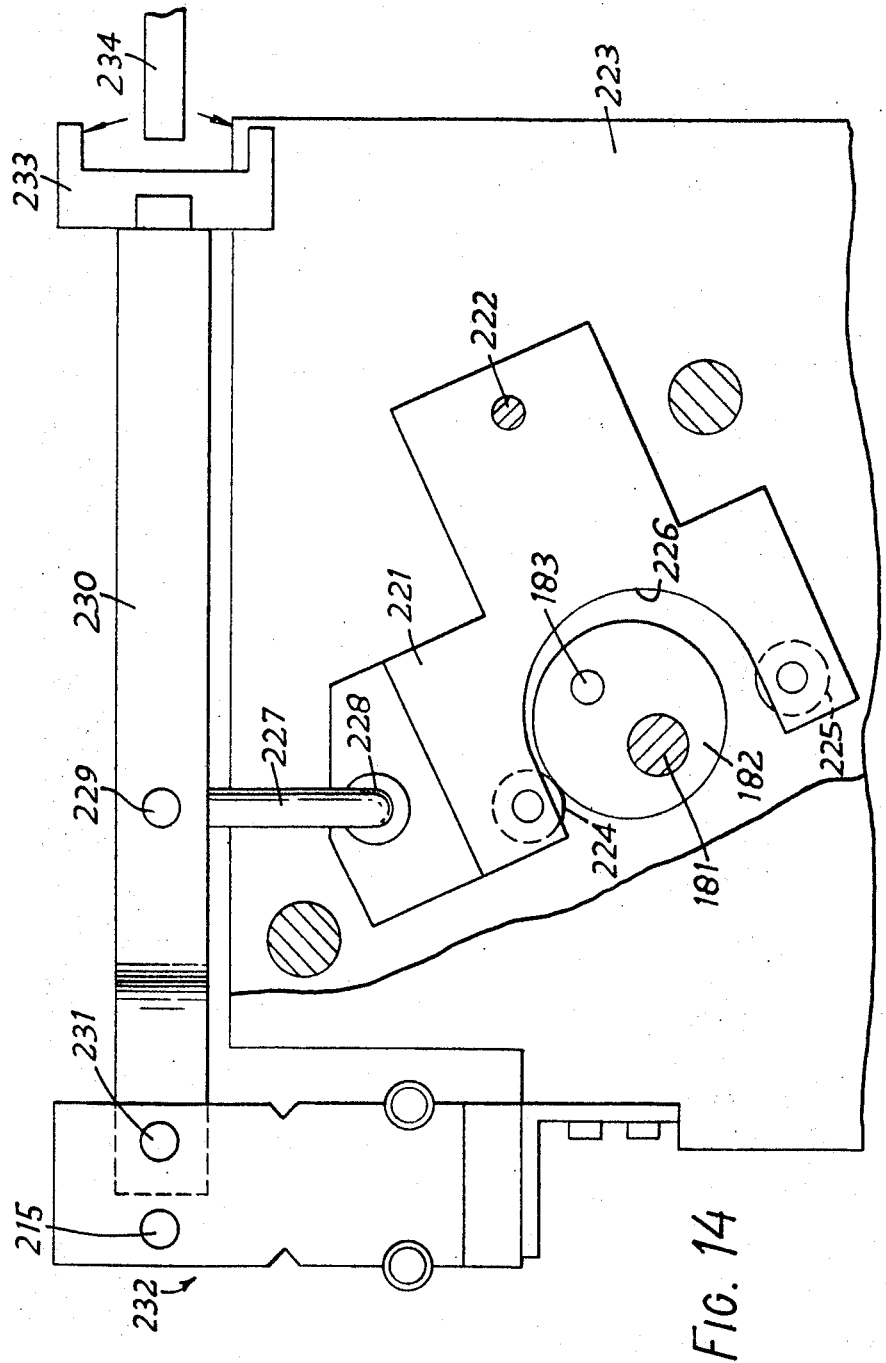
FIG. 14 is a view of the syringe valve drive mechanism.

In the arrangement illustrated and as shown particularly in FIG. 14 a valve drive block 221 is pivotally mounted at 222 on a separate plate 223 extending within the syringe mechanism but not shown in FIGS. 9, 10 or 13. The block 221 carries two rollers 224 and 225 on opposite jaws of apart circular sectioned mouth 226. The mouth 226 has a larger diameter than either of the blocks 182 (FIG. 9) and is located to embrace one of these blocks with the rollers 224 and 225 having their axes on a diameter of the shaft 181. As the appropriate block 182 rotates it engages a roller 224 and 225 at opposite points of its rotation and moves the drive block 221 backwards and forwards. A rod 227 is pivotally coupled at 228 to the valve drive block 221 and at its upper end is pivotally coupled at 229 intermediate the length of a lever 230. The latter has its rear end pivoted at 231 to a lost motion mounting generally indicated at 232 and similar to that described in connection with FIGS. 10 and 13, while the other end of the lever 230 carries a drive member 233. The lever 230 is thus pushed upwardly about its pivot 231 after 180° of rotation of the shaft 181 and after one revolution of this shaft the lever 230 is pulled downwardly about its pivot 231. The up and down movement of the drive member 233 operates a rod 234 which moves the appropriate parts of the valve 7 between its two positions. The lost motion member 232 is provided to ensure positive end movement of the valve 7.

In an alternative arrangement (not shown) the rod 227 could be driven directly by a suitable cam mounted on the shaft 181.

As described in our above mentioned application No. 655,442 when it is required to change the cycle of operation of the apparatus the syringe plate 6 together with its syringes 179 is detached from the apparatus and a fresh syringe plate previously set up for another desired cycle is attached to the apparatus with the individual syringes set to dispense appropriate volumes of liquid.

The above description includes various references to the control circuit for the apparatus but except where considered necessary for clarity this has not been described as it is not considered to form part of the present invention.

We claim:

1. A multiple pipetting apparatus comprising a carriage for supporting in a generally rectangular array a plurality of receptacles; a nozzle support; drive means to move the carriage and the nozzle support horizontally at right angles to one another and to move the nozzle support vertically towards and away from the carriage, the nozzle support comprising a first driven part capable of carrying at least one nozzle and a second part capable of carrying at least one nozzle and being movable upwardly by said first part and being selectively movable downwardly under the action of gravity according to the relative horizontal positions of the nozzle support and the carriage.

2. Apparatus according to claim 1 comprising a nozzle support carriage; a first motor for moving the carriage horizontally in a first direction, a second motor for moving the nozzle support carriage horizontally in a second direction at right angles to the first direction and a third motor mounted on the nozzle support carriage for moving the first part of the nozzle support vertically.

3. Apparatus according to claim 2 in which the first part of the nozzle support is mounted on a block slidable on a guide carried by the nozzle support carriage and the second part of the nozzle support is mounted on a second block slidable above the first block on the same guide.

4. Apparatus according to claim 3 in which an arm carried by the second block successively engages with and between projections on a castellated plate extending transversely across the apparatus in the direction of movement of the nozzle support carriage so that the second part of the nozzle support follows the first part to its lowermost position on the guide under the action of gravity only upon each alternate downward movement of the first part.

5. Apparatus according to claim 2 in which the first and second parts of the nozzle support each comprise mounting means for a plurality of nozzle blocks disposed in alignment in the direction of movement of the carriage.

6. Apparatus according to claim 5 in which the first part comprises one mounting means pivotable about a vertical axis prior to each downward movement of said first part in to a position whereby a nozzle carried on a nozzle block associated therewith is moved from a position adjacent a nozzle carried by another nozzle block of said first part to a position corresponding with a nozzle position on said second part.

7. Apparatus according to claim 6 in which pivoting movement of said mounting means is controlled by a lever mechanism coupled with the castellated plate.

8. Apparatus according to claim 7 comprising latch means for positively maintaining said mounting means in either of its two positions when said first part is below its uppermost position.

9. Apparatus according to claim 2 in which the nozzle support carriage is driven by a lead screw extending transversely across the apparatus and runs on the lead screw and a further guide track.

10. Apparatus according to claim 9 in which the nozzle support carriage carries two sets of guide rollers axially spaced along the lead screw each set comprising at least two rollers both axially and circumferentially spaced apart relative to the lead screw and being freely rotatable in engagement with the land to the lead screw about axes at an angle to the axis thereof equal to the helix angle of the lead screw.

11. Apparatus according to claim 3 in which the block carrying the first part of the nozzle support is driven by a rack and pinion mechanism coupled with the third motor by means for alternatively imparting opposite rotational movement to the pinion.

12. Apparatus according to claim 11 in which said means comprises a crank arm and a toothed sector plate.

13. Apparatus according to claim 2 in which downward movement of said first part takes place against the extension of a counterbalance spring.

14. Apparatus according to claim 5 comprising manually operating latch means associated with each mounting means to enable a nozzle block to be held thereon.

15. Apparatus according to claim 2 comprising first indexing means movable with the carriage and adjustable relative thereto to indicate a particular row of receptacles on the carriage and a first microswitch operable by said first indexing means when the carriage is moved a predetermined distance relative to the nozzle support; second indexing means movable to indicate a particular receptacle in a row and engageable by the nozzle support as the latter moves therepast to operate a second microswitch, said first and second microswitches being connected in parallel in a control circuit for energization of the first, second and third motors to terminate the cycle of the apparatus.

16. Apparatus according to claim 2 comprising a fourth motor driving a syringe operating mechanism comprising a crank shaft, a common connecting rod reciprocating a separate drive block for each syringe the drive blocks being coupled with separate lost motion mechanism operable at the end of each stroke of the drive blocks.

17. Apparatus according to claim 16 in which the drive blocks are each connected to a vertically movable guide rod beneath a drive member slidable thereon and urged downward against the drive block by a spring.

18. Apparatus according to claim 17 comprising a plurality of syringes mounted on a syringe plate removable from the apparatus the pistons of the syringes each being coupled with a driver engageable between associated drive blocks and drive members of the syringe drive mechanism so that the upward and downward movement of the latter reciprocates the pistons in the syringes.

19. Apparatus according to claim 18 comprising movable stop means associated with each driver to insure that after a dispensing stroke of the syringes all the pistons become stationary at the same time.

20. Apparatus according to claim 16 comprising movable stop means associated with each driver to enable the filling stroke of each syringe to be separately adjustable, lost motion being provided in the associated part of the syringe drive mechanism by sliding of the drive member on its guide rod against the action of its spring.

21. Apparatus according to claim 16 comprising a valve carried by the syringe plate and connectible externally of the apparatus between syringes on the plate and the nozzle unit.

22. Apparatus according to claim 21 in which the valve is moved from one position to another by operating mechanism driven by the fourth motor and coupled with lost motion mechanism.

References Cited
UNITED STATES PATENTS

| | | | |
|---|---|---|---|
| 2,624,656 | 1/1953 | Andrews et al. | 23—259 |
| 3,143,393 | 8/1964 | De Seguin des Hons | 23—253 |
| 3,178,266 | 4/1965 | Anthon | 23—259X |
| 3,327,535 | 6/1967 | Sequeira | 23—259X |
| 3,413,097 | 11/1968 | Jungner | 23—253X |

MORRIS O. WOLK, Primary Examiner

R. E. SERWIN, Assistant Examiner

U.S. Cl. X.R.

23—253; 73—423; 141—130, 269